United States Patent
Kondo et al.

(10) Patent No.: US 6,215,207 B1
(45) Date of Patent: Apr. 10, 2001

(54) TORQUE MOTOR HAVING UNIFORM TORQUE OUTPUT CHARACTERISTICS

(75) Inventors: Jiro Kondo, Obu; Tomokazu Kondo; Yuichiro Miura, both of Anjo; Hideki Kawamura, Chita-gun, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/137,523

(22) Filed: Aug. 21, 1998

(30) Foreign Application Priority Data

Aug. 26, 1997 (JP) .................................................. 9-229440
Sep. 5, 1997 (JP) .................................................. 9-240823
Jan. 20, 1998 (JP) ............................................... 10-008783

(51) Int. Cl.$^7$ ........................... H02K 33/00; H02K 35/00
(52) U.S. Cl. ......................... 310/36; 310/154; 310/156; 310/162; 310/254; 310/261
(58) Field of Search .................. 310/49 R, 162, 310/254, 156, 270, 164, 193, 36; 123/399

(56) References Cited

U.S. PATENT DOCUMENTS

| | | | |
|---|---|---|---|
| 3,914,859 | * 10/1975 | Pierson | 290/596 |
| 3,989,967 | * 11/1976 | Kikuyama et al. | 310/112 |
| 4,048,548 | * 9/1977 | Nakajima et al. | 318/138 |
| 4,055,785 | * 10/1977 | Nakajima et al. | 318/138 |
| 4,095,129 | 6/1978 | Tanai | 310/156 |
| 4,714,851 | * 12/1987 | Bertram et al. | 310/156 |
| 4,742,259 | * 5/1988 | Schaefer et al. | 310/156 |
| 4,850,322 | * 7/1989 | Uthoff et al. | 123/399 |
| 4,910,861 | * 3/1990 | Dohogne | 29/598 |
| 5,016,588 | * 5/1991 | Pagdin et al. | 123/399 |
| 5,162,685 | * 11/1992 | Yamaguchi et al. | 310/156 |
| 5,175,461 | * 12/1992 | Zigler et al. | 310/156 |
| 5,287,835 | * 2/1994 | Florenza et al. | 123/352 |
| 5,334,893 | * 8/1994 | Oudet et al. | 310/38 |
| 5,485,045 | * 1/1996 | Canders | 310/156 |
| 5,521,451 | * 5/1996 | Oudet et al. | 310/266 |
| 5,705,873 | 1/1998 | Sato | 310/143 |
| 5,723,929 | * 3/1998 | Niimi | 310/154 |
| 5,773,909 | * 6/1998 | Hansen et al. | 310/261 |
| 5,841,212 | * 11/1998 | Mita et al. | 310/156 |
| 5,880,551 | * 3/1999 | Prudham | 310/254 |

FOREIGN PATENT DOCUMENTS

| | | |
|---|---|---|
| 6-253516 | * 9/1994 | (JP) . |
| 9-84283 | * 3/1997 | (JP) . |
| 9-84284 | * 3/1997 | (JP) . |
| 9-93844 | * 4/1997 | (JP) . |
| 9-298864 | * 11/1997 | (JP) . |

OTHER PUBLICATIONS

Kondo U.S. Application No. 09/218,082; Filed Dec. 22, 1998.
Document No. 09/022,488, Filing date Feb. 12, 1998, Tojo et al., Class 123, Subclass 399.*

* cited by examiner

*Primary Examiner*—Elvin Enad
(74) *Attorney, Agent, or Firm*—Nixon & Vanderhye PC (57) ABSTRACT

A torque motor comprises a rotor having a pair of permanent magnet groups, and a pair of stator cores. Each magnet group includes a plurality of plate or rod-shaped permanent magnets arranged in a circumferential direction. The magnet groups are arranged asymmetrically with respect to a rotary axis of the rotor. That is, one magnet group is displaced one-half angle of the pitch angle of each permanent magnet from the symmetric position of the other magnet group with respect to the rotary axis of the rotor. Alternatively, the stator cores are arranged asymmetrically with respect to the rotary axis of the rotor so that a front end of one stator core is displaced from the symmetric position of a front end of the other stator core in the circumferential direction. A cylindrical magnetic cover is fitted on the rotor to cover the permanent magnets circumferentially.

26 Claims, 9 Drawing Sheets

TORQUE MOTOR HAVING UNIFORM TORQUE OUTPUT CHARACTERISTICS

CROSS REFERENCE TO RELATED APPLICATION

This application relates to and incorporates herein by reference Japanese Patent Applications No. 9-229440 filed on Aug. 26, 1997, No. 9-240823 filed on Sep. 5, 1997 and No. 10-8783 filed on Jan. 20, 1998.

BACKGROUND OF THE INVENTION

This invention relates to a torque motor and, more particularly to a torque motor which may be used for a flow control valve of an internal combustion engine, for instance.

As disclosed in JP-A 3-31529 and JP-A 6-253516, a conventional torque motor uses permanent magnets shaped arcuately as a part of its rotor. Those torque motors may be used as an actuator for an intake air flow control valve of an internal combustion engine. However, manufacturing the permanent magnets into the arcuate shape necessitates a cutting process and produces waste of magnetic material.

Figure 17:
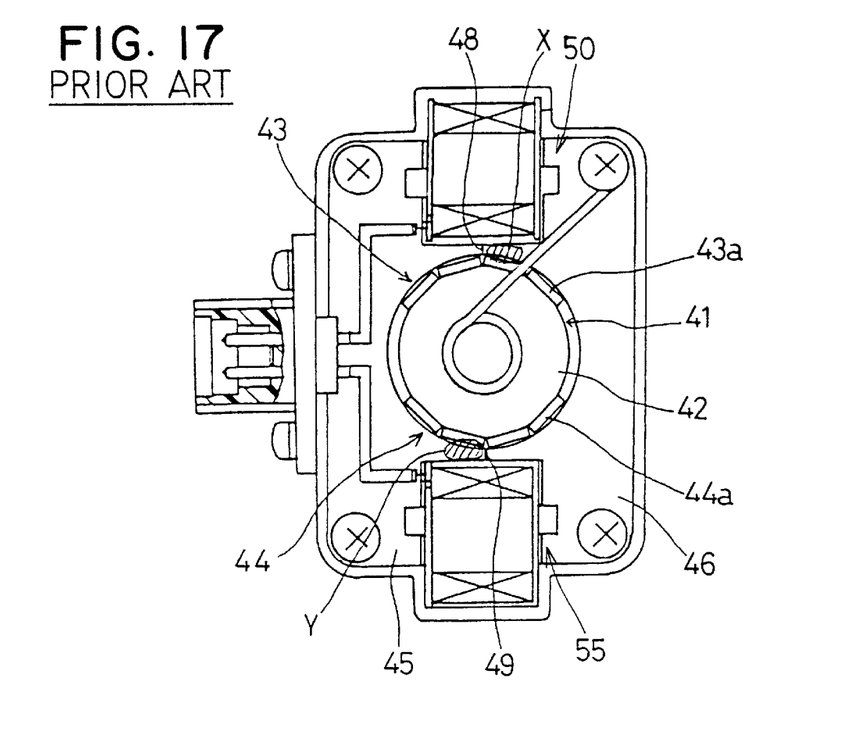
FIG. 17 is a side view showing a conventional torque motor.

It is therefore proposed that a torque motor uses a plurality of plate-shaped permanent magnets on its outer periphery. That is, as shown in FIG. 17, a torque motor has a rotor 41 comprising a rotor core 42 and two diametrically opposed permanent magnet groups 43 and 44 arranged symmetrically with respect to a rotary axis of the rotor 41. The permanent magnet groups 43 and 44 are spaced apart from each other on the rotor core 42 in the circumferential direction. The magnet group 43 has a plurality of plate-shaped permanent magnets 43a arranged in the circumferential direction on a part of the outer periphery of the rotor core 42, while the magnet group 44 has the same number of plate-shaped permanent magnets 44a arranged in the similar manner on another part of the rotor core 42. The stator cores 45 and 46 are joined at a pair of stator core connecting parts 48 and 49. The connecting parts 48 and 49 for the corresponding magnet groups 48 and 49 are diametrically opposed on the circumference of the rotor core 42. The rotor 41 is held rotatably inside of a pair of stator cores 45 and 46 between which solenoid units 50 and 55 are sandwiched.

Figure 18:
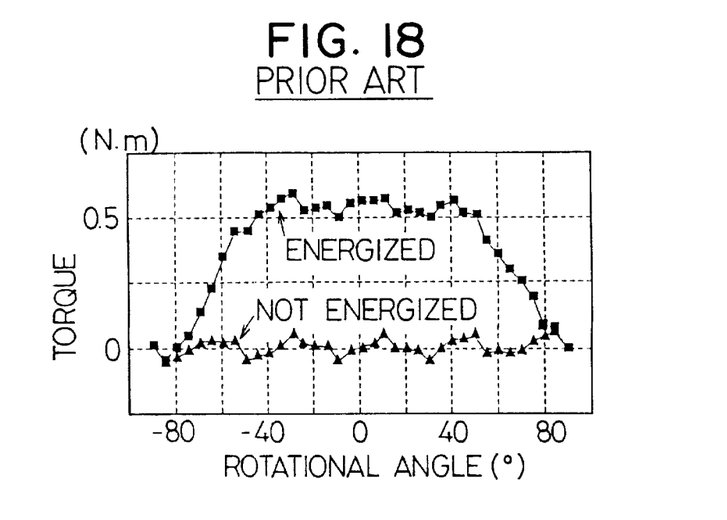
FIG. 18 is a characteristics graph of a torque generated relative to a rotational angle of the conventional torque motor.

The above torque motor generates a torque varying in dependence on the rotational angle of the rotor as shown in FIG. 18. The torque is a composite of torque generated most strongly at two locations, that is, at an X-part near the slot connecting part 48 and a Y-part near the slot connecting part 49. As the magnet groups 43 and 44 are arranged symmetrically with respect to the rotary axis of the rotor 41 and are spaced apart from each other circumferentially on the rotor core 42, the torque fluctuates periodically during rotation of the rotor 41 whether the solenoid units 50 and 55 are energized or not energized, thus resulting in ripple on the generated torque.

It is also proposed by JP-A 9-84283, JP-A 9-84284 and JP-A 9-93844 that a torque motor have a non-magnetic cylindrical cover fitted to firmly hold permanent magnets on the rotor. In this instance also, the torque generated by the motor fluctuates periodically.

SUMMARY OF THE INVENTION

It is therefore an object of the present invention to provide a torque motor which is capable of generating torque having less fluctuation.

According to a first aspect of the present invention, a torque motor comprises a pair of stator cores and a rotor having a pair of magnet groups. Either the front ends of the stator cores or the magnet groups are arranged asymmetrically with respect to a rotary axis of the rotor. Preferably, the front end of one stator core aligns with a circumferential center of one of permanent magnets of one magnet group when the front end of the other stator core aligns with a circumferential end of one of the permanent magnets of the other magnet group. More preferably, one of the front ends of the stator cores is displaced in the circumferential direction from a symmetric line crossing the rotary axis of the rotor and the other of the front ends of the stator cores. Alternatively, one of the magnet groups are displaced in the circumferential direction from a symmetric line crossing the rotary axis of the rotor and a circumferential center of one of the other the magnet groups.

According to a second aspect of the present invention, a torque motor has a magnetic member covering permanent magnets arranged on a rotor core in a circumferential direction. Preferably, the permanent magnets are divided into a pair of magnet groups separated from each other in a circumferential direction leaving spaces therebetween, and the magnetic member has non-magnetic parts which cover the spaces. More preferably, each permanent magnet is in a plate or rod shape, and the magnetic member and the permanent magnets have a substantially uniform gap circumferentially therebetween.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

A torque motor according to the present invention is applied to a throttle control device for an internal combustion engine in the following embodiments, throughout which the same or like parts are denoted by the same or like reference numerals.

(First embodiment)

Figure 1A:
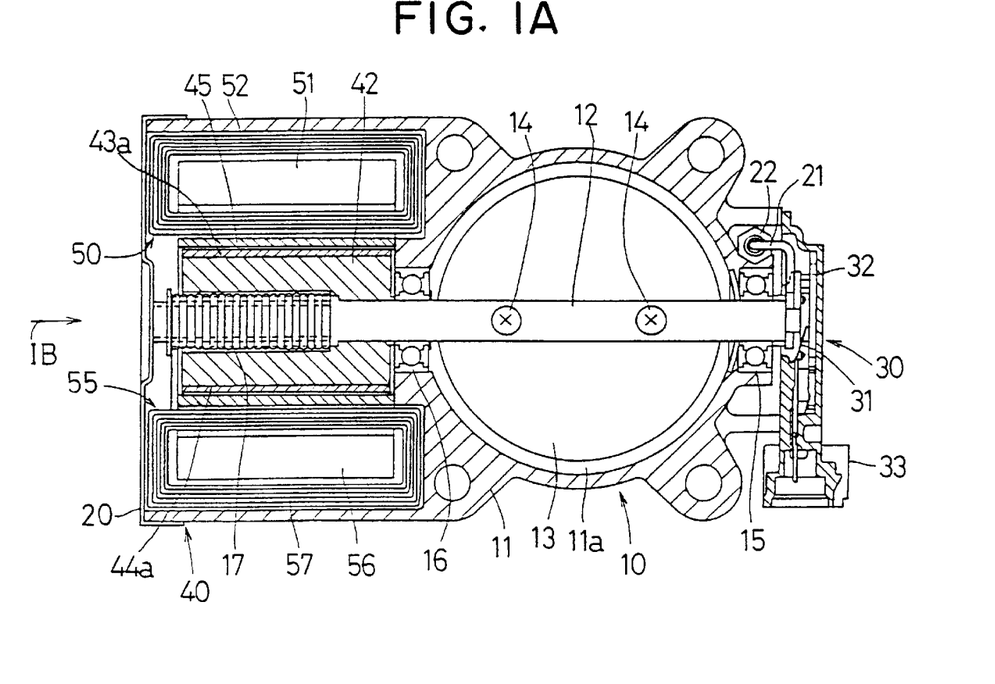
FIG. 1A is a sectional view showing a throttle valve control device using a torque motor according to a first embodiment of the present invention.
Figure 1B:
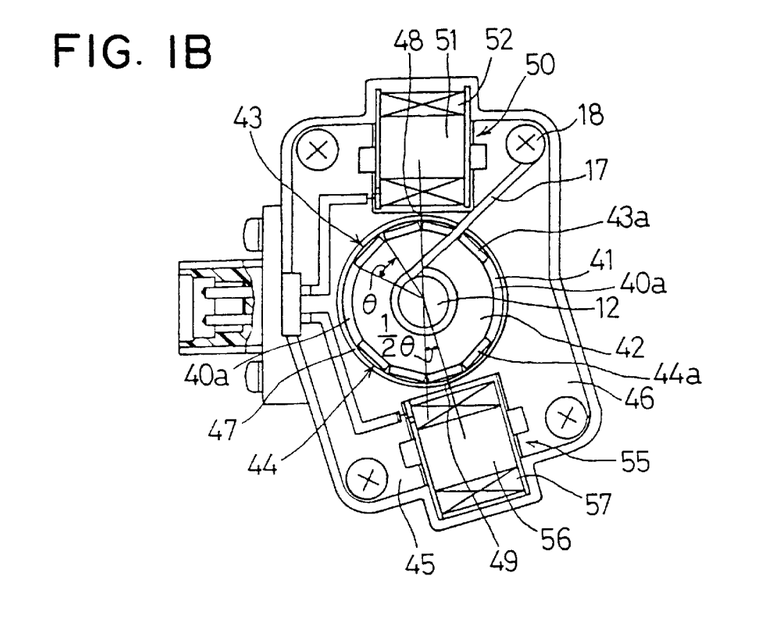
FIG. 1B is a side view showing the throttle valve control device as viewed in the direction IB in FIG. 1A with a cover being removed.

In the first embodiment shown in FIGS. 1A and 1B, a throttle valve control device 10 has a torque motor 40 as an actuator which variably controls the opening angle of a throttle valve 13. The throttle valve 13 is in a disk shape and is fixed to a throttle shaft 12 by screw threads 14. A throttle body 11 rotatably supports the throttle shaft 12 with a pair of bearings 15 and 16, so that the throttle valve 13 rotates with the throttle shaft 12 to vary an intake air flow area of an intake air passage 11a defined by the inner wall surface of the throttle body 11.

The throttle shaft 12 fixedly supports a throttle lever 21 at its one end to rotate the lever 21 together with the throttle valve 13. A stopper screw 22 is provided to abut the throttle lever 21, thus defining a fully-closed position of the throttle valve 13. The fully-closed position of the throttle valve 13 is adjustable by the threaded position of the stopper screw 22.

A rotational angle sensor 30 is fixed to one axial end of the throttle shaft 12. It comprises an on/off contact part 31, a substrate 32 formed with a resistor in a film form and a housing 33 which fixedly supports the substrate 32. The contact part 31 is press-fitted into the throttle shaft 12 for rotation with the throttle shaft 12 and slidable on the resistor formed on the substrate 32. With a constant voltage (5V) being applied to the resistor on the substrate 32 and the contact part 31 sliding on the resistor in response to the rotary movement of the throttle valve 13, the sensor 30 produces a voltage varying with the rotary position of the throttle valve 13 to indicate the rotary position of the throttle valve 13.

The torque motor 40 is positioned at the other axial end of the throttle shaft 12. It comprises a rotor 41, a pair of stator cores 45 and 46, and a pair of solenoid units 50 and 55 mounted on the stator cores 45 and 46, respectively, so that the rotor 41 rotates in the clockwise direction in FIG. 1B. A cover 20 closes a side end of the torque motor 40.

The rotor 41 comprises a rotor core 42 press-fitted on the throttle shaft 12, and a pair of permanent magnet groups 43 and 44 provided on the rotor core 42 oppositely to each other in the radial direction with respect to the throttle shaft 12, that is, the rotary axis of the rotor 40. The magnet groups 43 and 44 have a plurality of plate-shaped permanent magnets 43a and 44a each in of the same size, respectively, and are attached to the outer periphery of the rotor core 42 with an adhesive. The permanent magnets 43a and 44a are arranged tightly in the circumferential direction in each of the magnet groups 43 and 44. The permanent magnets 43a and 44a are the same in number and positioned 180° apart from each other, leaving spaces 40a between the magnet groups 43 and 44 in the circumferential direction.

Each magnet 43a, 44a is magnetized in the radial direction of the rotor 41 and arranged so that one of the magnet groups 43 and 44 provides N-pole at its radially outermost peripheral surface while the other of the same provides S-pole at its radially outermost peripheral surface. Thus, the magnet groups 43 and 44 provide one N-pole and one S-pole on the radially opposing peripheral surfaces of the rotor 41. It is desired that each magnet is made of magnetic material in the rare-earth salt such as neodymium system material or samarium-cobalt system material which generates high magnetism. However, other magnetic materials such as ferrite system material may also be used.

The stator cores 45 and 46 and solenoid units 50 and 55 form a stator. Each core 45 and 46 is formed by stacking a plurality of thin magnetic steel plates in the radial direction and disposed to oppose each other, thus providing a hollow space 47 therebetween. The hollow space 47 rotably accommodates the rotor 41 therein. The cores 45 and 46 provide a pair of magnetic poles when the solenoid units 50 and 55 are energized electrically. The cores 45 and 46 are joined to each other at stator core connecting parts (slot connecting parts) 48 and 49, so that the hollow space 47 is substantially in a slotless type configuration in which no space or slot exists in the inner periphery of the stator cores 45 and 46 in the circumferential direction.

The stator core connecting parts 48 and 49 are formed thin enough to reduce magnetic flux passing cross section to as small as possible, thus forming boundaries between a pair of magnetic poles of the stator. The stator core connecting parts 48 and 49 are arranged asymmetrically with respect to the rotary axis of the rotor 41. That is, assuming that the pitch angle of arranging the magnets 43a and 44a is θ, the stator core connecting parts 48 and 49 are arranged to deviate one half (θ/2) of the magnet arranging pitch angle from the symmetrical arrangement. Thus, the magnetic pole pair on the rotor 41 and the magnetic pole pair on the stator are displaced one half of the magnet arranging pitch angle (θ), that is, one half of the each magnet pitch, in the circumferential direction.

The solenoid unit 50 comprises an iron core 51 and a solenoid coil 52 wound around the core 51, while the solenoid unit 55 comprises an iron core 56 and a solenoid coil 57 wound around the iron core 56. The solenoid units 50 and 55 are sandwiched between the stator cores 45 and 46. The solenoid units 50 and 55 are displaced by the angle (θ/2) from 180° opposite position in the circumferential direction to face in position the stator core connecting parts 48 and 49, respectively. A return spring 17 has one end fixed to the rotor core 42 and the other end fixed to the stator by a thread 18, thereby biasing normally the throttle valve 13 in a throttle closing direction.

With the solenoid coils 52 and 57 being energized electrically, the stator core 45 and 46 generate the magnetic pole pair of N-pole and S-pole. The magnetic pole pairs of the rotor 41 and the stator core, which attracts and repels alternately, generates torque to rotate the rotor 41 against the biasing force of the return spring 17.

Figure 2:
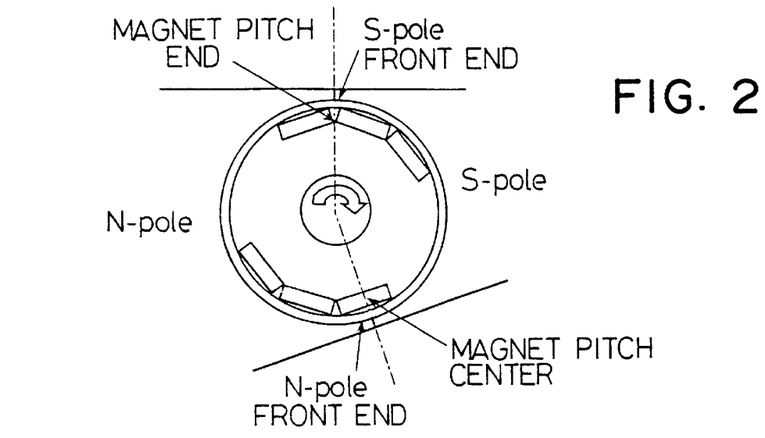
FIG. 2 is a schematic view showing an operational mode of the torque motor according to the first embodiment.
Figure 3:
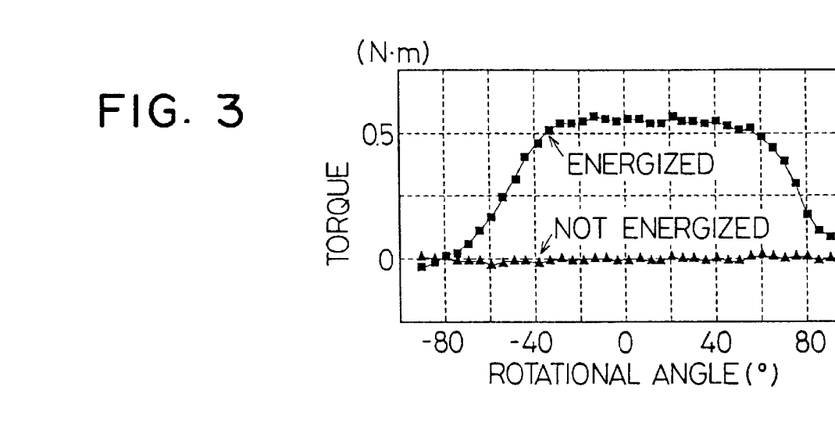
FIG. 3 is a characteristics graph of a torque generated relative to a rotational angle of the torque motor according to the first embodiment.

In the above embodiment, it is assumed that one end of each stator core, to which each plate-shaped permanent magnet approaches first during rotor rotation, is defined as a front end. The magnet groups are disposed symmetrically with respect to the rotary axis of the rotor 41, while the front ends of the stator cores 45 and 46 are disposed asymmetrically with respect to the rotary axis of the rotor 41, that is, as shown in FIGS. 2 and 3, the S-pole front end and the N-pole front end are displaced by the one-half pitch angle (θ/2). Thus, when one front end of the stator (S-pole front end of stator in FIG. 2) aligns with the circumferential end (magnet pitch end) of a plate-shaped permanent magnet of one magnet group, the other front end of the stator (N-pole front end of stator in FIG. 2) aligns with the circumferential center (magnet pitch center) of a plate-shaped permanent magnet of the other magnet group.

According to this embodiment, because of the above asymmetric arrangement of the N-pole front end and the S-pole front end in the stator relative to the symmetric arrangement of the N-pole and S-pole in the rotor 41, the fluctuation of generated torque, which varies periodically in dependence on the rotational angle of the rotor 41, shifts in phase a one-half cycle. Thus, the ripples in the generated torque cancel each other. As a result, as shown in FIG. 3, the generated torque can be stabilized at substantially the same level in a predetermined angular rotation interval in both cases where the solenoid coils are energized and not energized. This enables an accurate control of the rotational angle of the rotor.

Figure 4:
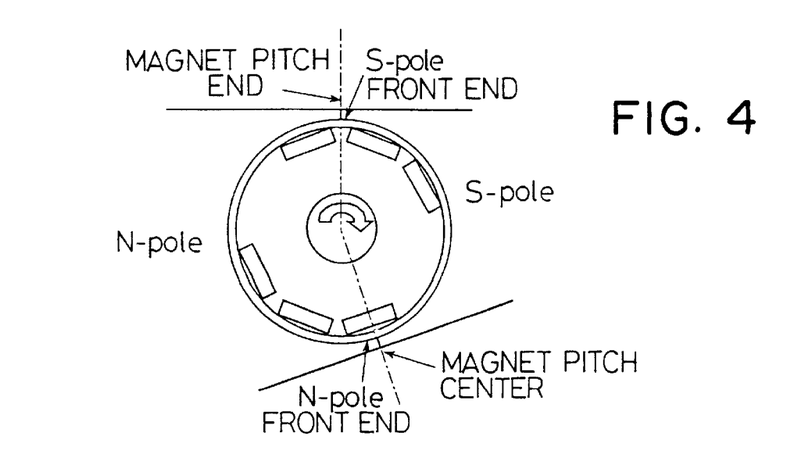
FIG. 4 is a schematic view showing a modification of the torque motor according to the first embodiment.

It is to be noted that the plate-shaped permanent magnets in each magnet group in the rotor need not be arranged in tight contact in the circumferential direction but may be arranged while leaving a certain space between the adjacent two of the permanent magnets as shown in FIG. 4. It is also possible that each permanent magnet on the rotor need not necessarily be plate-shaped and that the stator core connecting parts 48 and 49 have respective air gaps therein.

The throttle control device 10 using the above torque motor operates as follows.

(1) Normal Running Condition:

In normal vehicle running including idling mode and automatic cruising mode, a desired opening angle of the throttle valve 13 is calculated by an electronic controller (not shown) based on an engine operating condition such as an accelerator depression and engine rotational speed. A control current is supplied to the solenoid coils 52 and 57 in accordance with the calculated desired opening angle. With the torque generated when the solenoid coils 52 and 57 are thus energized, the rotor 41 rotates against the biasing force of the return spring 17.

The throttle valve 13 also rotates with the rotor 41 to open. The throttle opening angle is detected by the rotational angle sensor 30 and fed back to the electronic controller. The controller thus feedback controls the throttle opening angle by varying the control current supplied to the solenoid coils 52 and 57. This feedback control reduces temperature-dependent changes in the generated torque, thereby controlling the throttle opening angle accurately.

(2) Failure Condition:

When the actual throttle opening angle detected by the detector 30 deviates from the desired throttle opening angle, the electronic controller determines the throttle opening angle control to be in failure. The controller then reduces or stops the control current to the solenoid coils 52 and 57 to close the throttle valve 13 by the return spring 17, thereby restricting the throttle valve 13 from opening excessively.

(Second Embodiment)

Figure 5:
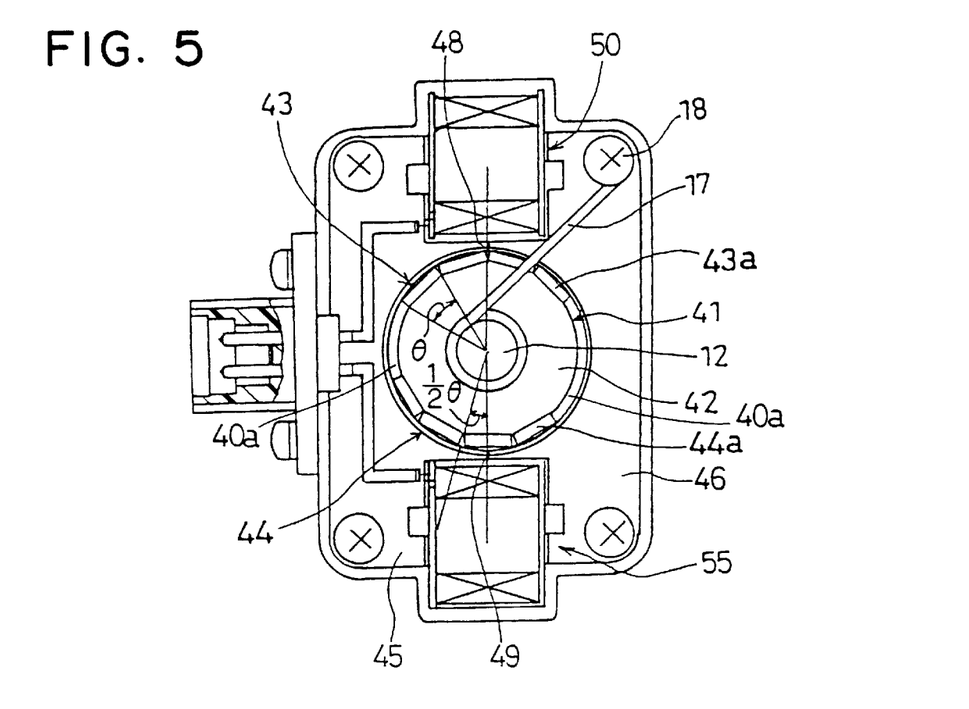
FIG. 5 is a side view of a torque motor according to a second embodiment of the present invention.

In the second embodiment shown in FIG. 5, the stator cores 45 and 46 are arranged symmetrically, and the stator core connecting parts 48 and 49 are also arranged symmetrically. That is, the stator core connecting parts 48 and 49 are positioned 180° oppositely. The solenoid units 50 and 55 are arranged to align with the stator core connecting parts 48 and 49, that is, to oppose each other with respect to the rotor 41. However, one of the magnet groups 43 and 44 is arranged to displace the one-half pitch angle (θ/2) of the magnet pitch angle (θ) from the symmetrical line on which the other magnet group is aligned.

Figure 6:
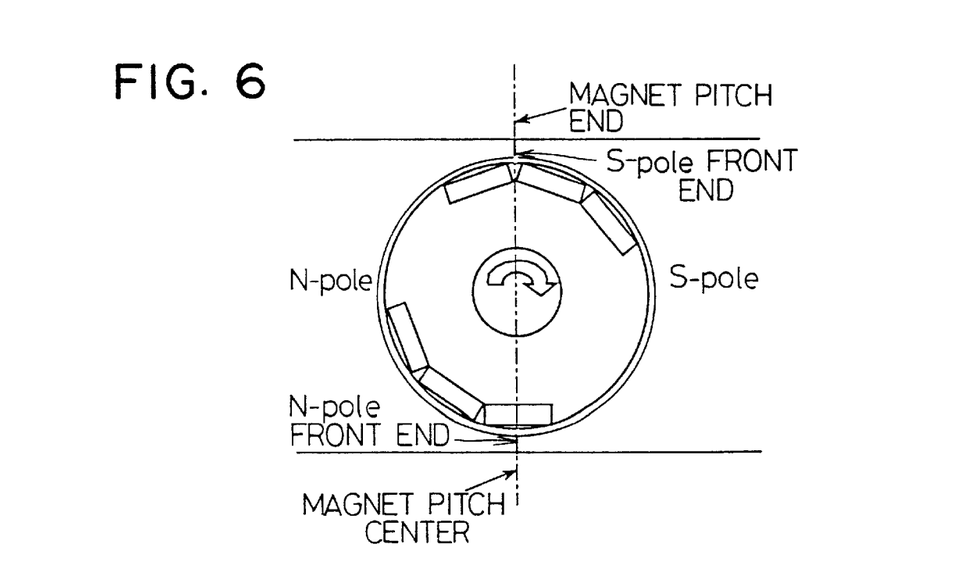
FIG. 6 is a schematic view showing an operational mode of the torque motor according to the second embodiment.
Figure 7:
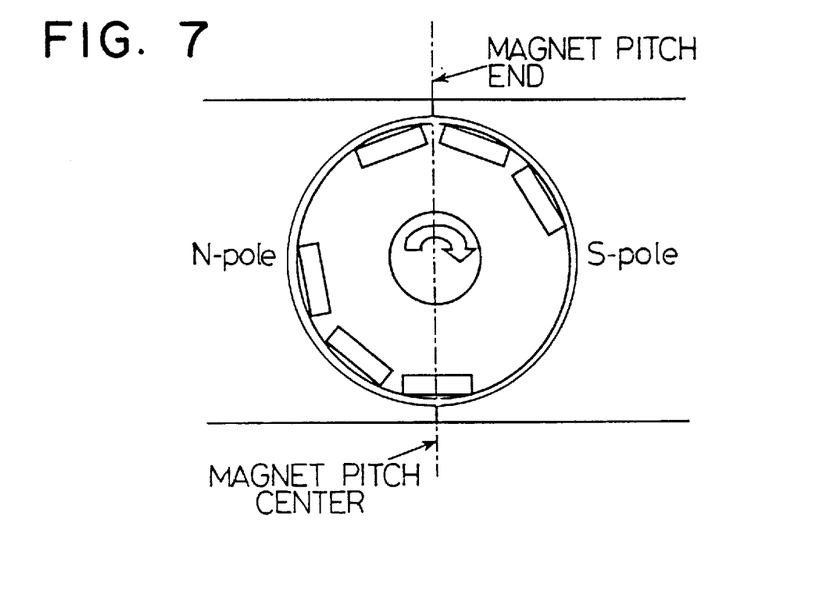
FIG. 7 is a schematic view showing another operational mode of the torque motor according to the second embodiment.

In this embodiment also, as shown in FIGS. 6 and 7, when the S-pole front end aligns with the magnet pitch end, the N-pole front end does not align with the magnet pitch end but aligns with the magnet pitch center. Thus, in the same manner as in the first embodiment, the ripples in the generated torque are cancelled, thereby assuring the stable torque generation over an angular rotation interval.

(Third Embodiment)

Figure 8:
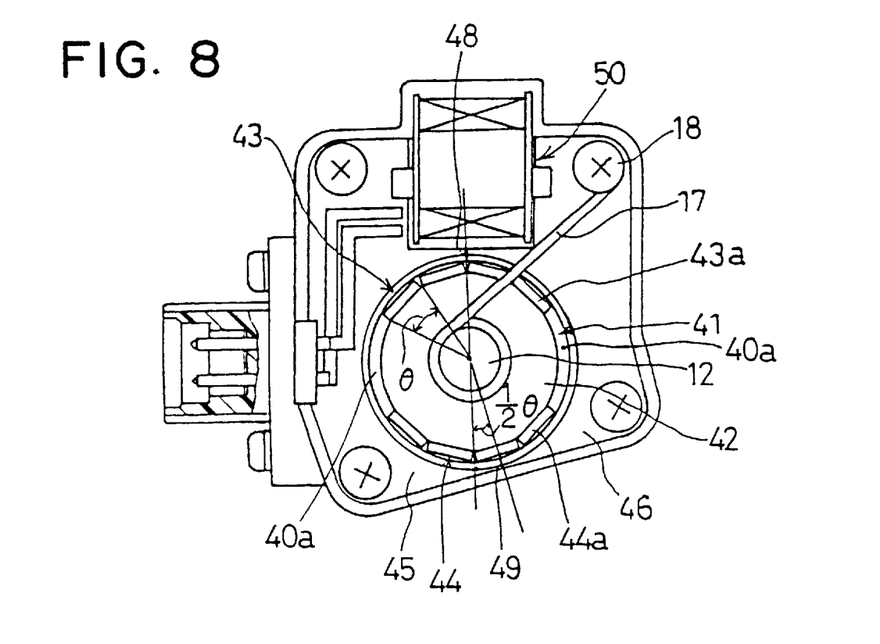
FIG. 8 is a side view of a torque motor according to a third embodiment of the present invention.

In this embodiment shown in FIG. 8, only one solenoid unit 50 is provided. This reduces the size and weight of the torque motor 40, while the two solenoid units 50 and 55 in the first and second embodiments increases the response period of the torque motor 40.

The slot connecting part 48 adjacent to the solenoid unit 50 and the connecting part 49 are arranged symmetrically. That is, the slot connecting part 49 is displaced one-half pitch angle (θ/2) from the symmetric line on the slot connecting part 48. This embodiment may be so modified that, as shown in the second embodiment (FIG. 5), the magnet groups 43 and 44 are arranged asymmetrically while arranging the stator core connecting parts 48 and 49 symmetrically.

(Fourth Embodiment)

Figure 9:
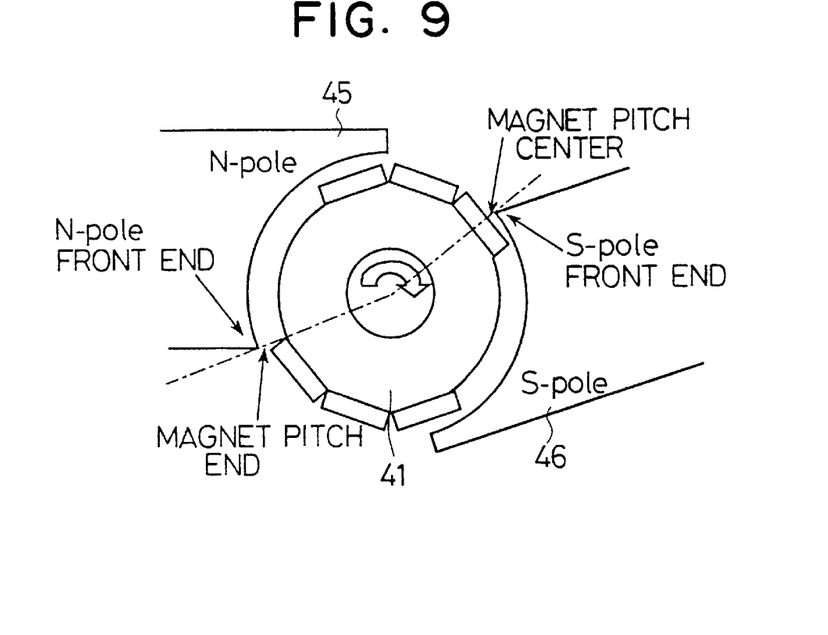
FIG. 9 is a schematic view showing an operational mode of a torque motor according to a fourth embodiment of the present invention.

In the fourth embodiment shown in FIG. 9, the stator cores 45 and 46 are arranged asymmetrically, and surround the rotor 41 only partially in the circumferential direction as opposed to the first to third embodiments in which the stator cores 45 and 46 surround the rotor 41 entirely in the circumferential direction.

(Fifth Embodiment)

Figure 10:
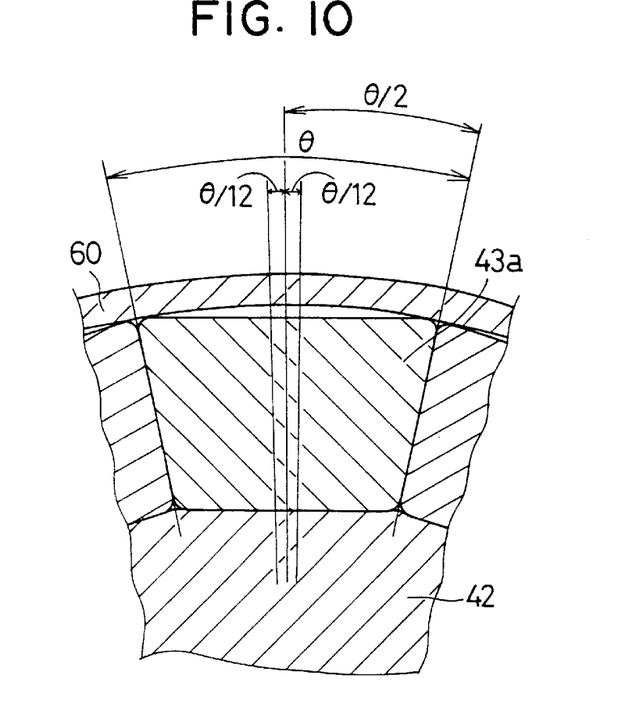
FIG. 10 is a sectional view showing a part of a rotor of a torque motor according to a fifth embodiment of the present invention.

In the fifth embodiment shown in FIG. 10, each permanent magnet 43a (44a) is in a rod shape having a trapezoidal cross section so that the whole side faces of the two circumferentially adjacent magnets 43a contact each other. Further, a cylindrical cover 60 made of iron is fitted on the outer periphery of the rotor 41 to tightly hold the permanent magnets 43a (44a) attached to the rotor core 42 by an adhesive. In this embodiment, displacement of each permanent magnet 43a (44a) within a range of a predetermined angle ±θ/12 from the center of the magnet is tolerable, while reducing the ripple of FIG. 18 to less than one-quarter. The torque motor according to this embodiment can meet requirements of an actuator for driving a throttle valve and can be manufactured by a simplified assembling process. From the standpoint of more accurately controlling the throttle valve, it is most desirable to reduce the ripple of FIG. 18 to about one-tenth.

(Sixth Embodiment)

Figure 11:
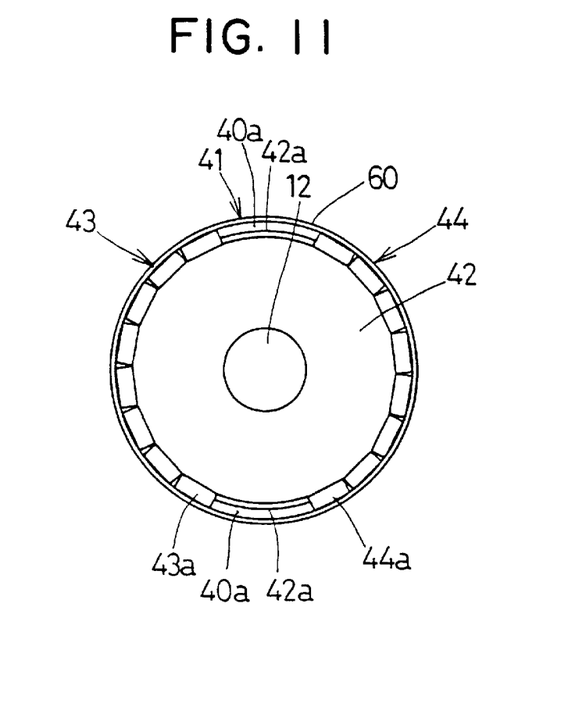
FIG. 11 is a sectional view showing a rotor of a torque motor according to a sixth embodiment of the present invention.

In the sixth embodiment shown in FIG. 11, the rotor core 42 has a pair of circular projections 42a in the circumferential spaces 40a between the permanent magnet groups 43 and 44 to define the positions of permanent magnets 43a and 44a attached to the rotor core 42. The cylindrical cover 60 made of magnetic material such as iron surrounds the whole of the rotor 40 thereby to firmly hold the permanent magnets 43a and 44a in the radially inward direction. Although not shown in the figure, the stator cores may be constructed symmetrically or asymmetrically as shown in the foregoing embodiments, while the magnet groups 43 and 44 are arranged symmetrically.

In manufacturing the rotor, the rotor core 42 is placed in the cylindrical cover 60 and then the permanent magnets 43a and 44a are inserted in the axial direction into the space between the rotor core 42 and the cylindrical cover 60. An adhesive material is flowed into the cylindrical cover 60 from its axial end side to fill the remaining spaces in the cylindrical cover 60 and fix the permanent magnets 43a between the rotor 41 and the cylindrical cover 60.

Figure 12:
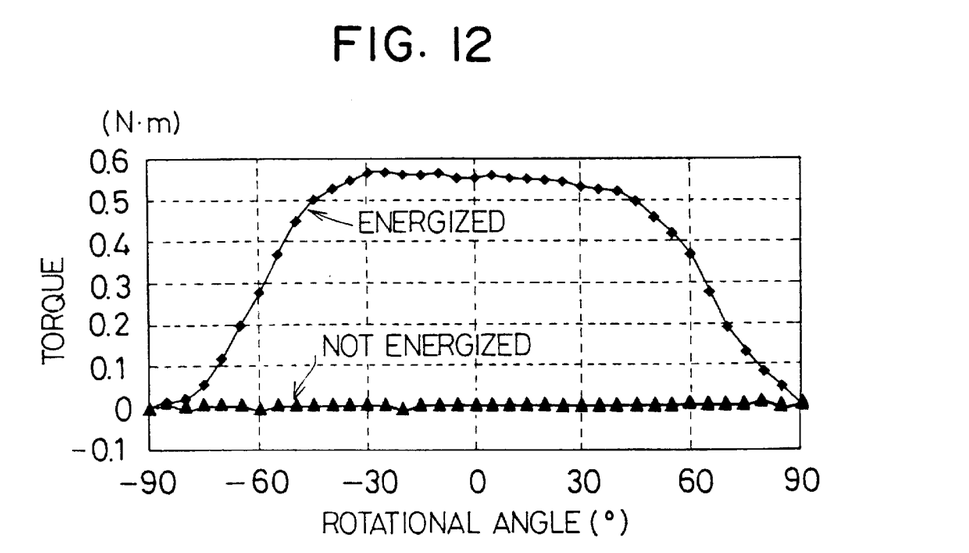
FIG. 12 is a characteristics graph of a torque generated relative to a rotational angle of the torque motor according to the sixth embodiment.

As the cylindrical cover 60 covers the magnet groups 43 and 44 in the circumferential direction and in the axial direction, the cylindrical cover 60 is magnetized in the radial direction by the permanent magnets 43a and 44a. As the magnetic flux passes from the circumferential ends of the magnet groups 43 and 44 to the opposite pole through the cylindrical cover 60, the magnetic flux does not concentrate at the circumferential ends of the magnet groups 43 and 44. Thus, the direction of the magnetic flux in the parts of the cylindrical cover 60 contacting the magnet groups 43 and 44 are made more uniform relative to the inner peripheral surface of the stator, and its density in the same parts of the cylindrical cover 60 is made more uniform. The air gap between the cylindrical cover 60 and the stator is equalized over the entire circumference of the rotor. For those reasons, as shown in FIG. 12, the fluctuation in the generated torque is reduced when the solenoids of the stator are energized even under the condition that both the magnet groups 43 and 44 as well as the stator cores are arranged symmetrically as in FIG. 17. The detent torque exerted on the rotor 41 when the solenoids of the stator is not energized is minimized to substantially zero.

It is to be noted that the magnetic plates 43a and 44a may be covered uniformly by a magnetic wire in place of the magnetic cylindrical cover 60. Non-magnetic resin material may be filled in the spaces between adjacent two of permanent magnets in each of the magnet group 43 and 44, and the outer periphery of the magnet groups 43 and 44 may be molded by a resin material mixed with fine or powder magnetic particles.

(Seventh Embodiment)

Figure 13:
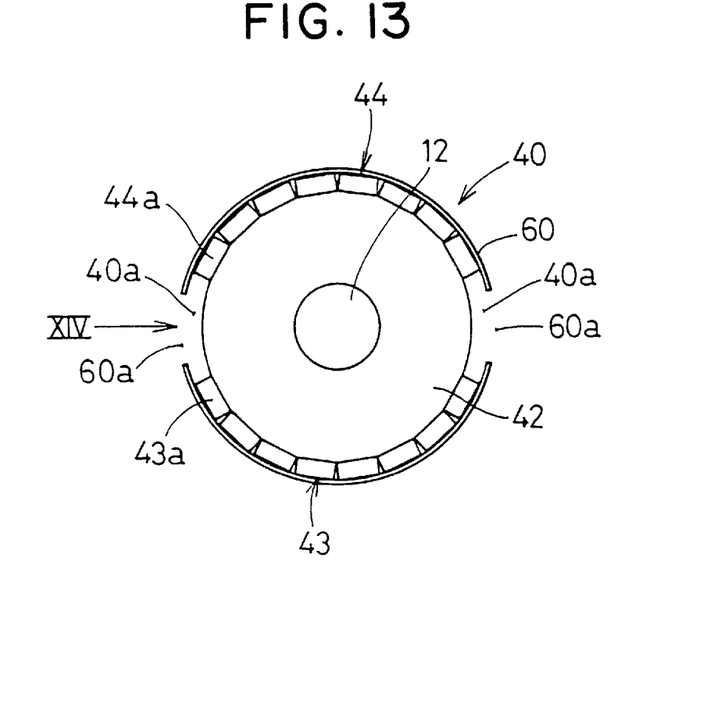
FIG. 13 is a sectional view showing a rotor of a torque motor according to a seventh embodiment of the present invention.
Figure 14:
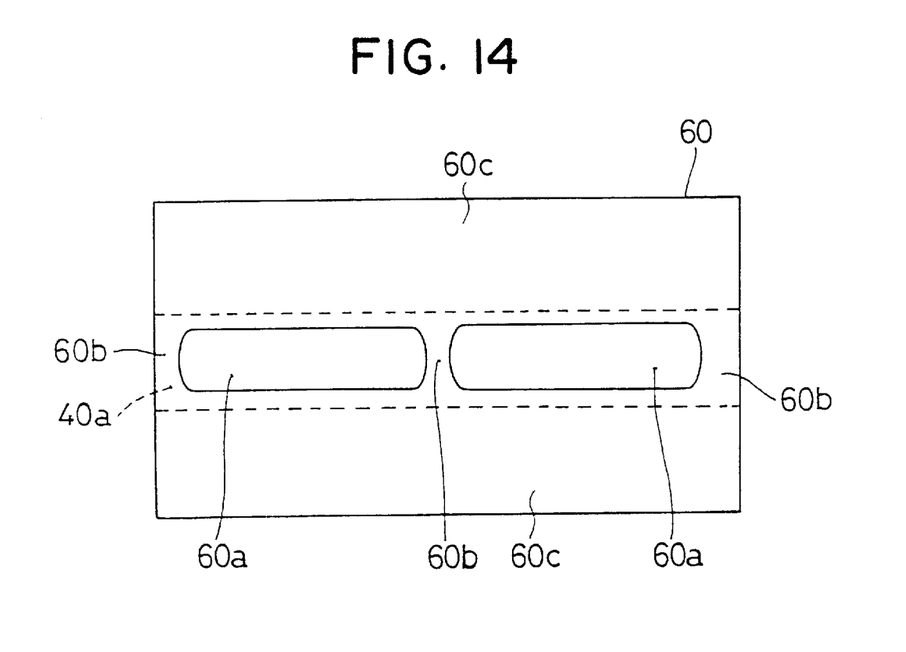
FIG. 14 is a front view showing the rotor as viewed in the direction XIV in FIG. 13.

In the seventh embodiment shown in FIGS. 13 and 14, the cylindrical cover 60 has slits 60a extending axially over the spaces 40a between the magnet groups 40a. The slits 60a are provided as a non-magnetic part. The slits 60a may be in a circular shape or replaced by a non-magnetic material. Magnet covering parts 60c of the cylindrical cover 60 are connected by connecting parts 60b. The connecting parts 60b not only maintains the cylindrical shape of the cover 60 but also restrict the permanent magnets 43a and 44a from being displaced by the centrifugal force of the rotor or by any impact force applied thereto.

Figure 15:
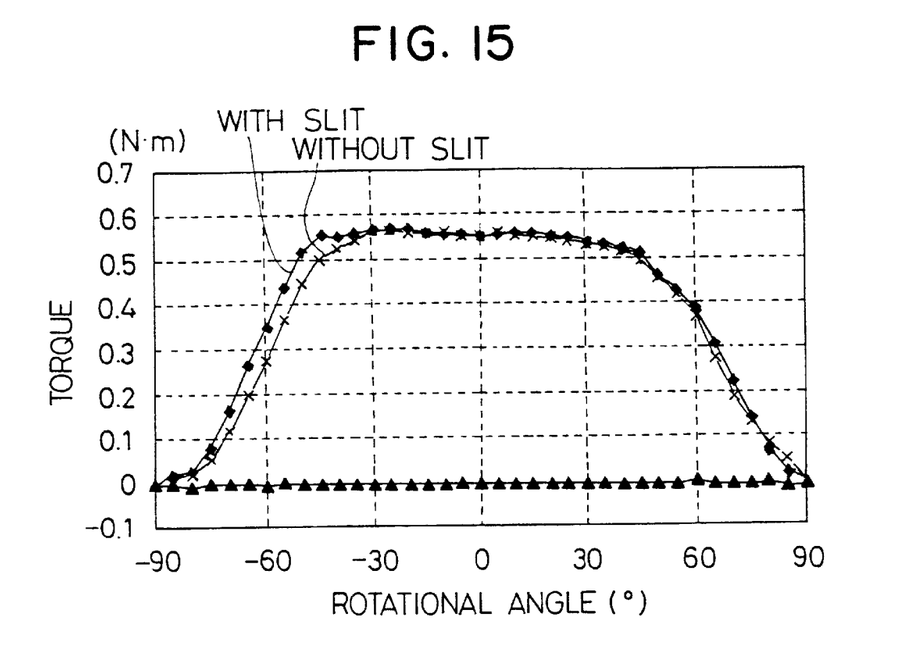
FIG. 15 is a characteristics graph of a torque generated relative to a rotational angle of the torque motor according to the seventh embodiment.

Those slits 60a restricts the magnetic flux from leaking in the circumferential direction between the circumferential edges of the magnet groups 43 and 44. As a result, as shown in FIG. 15, when the motor is driven from the fully-closed throttle position in the negative rotational angle, the initial torque of the motor is enabled to rise more quickly than in the case of no slits (sixth embodiment in FIGS. 11 and 12). This characteristics provides a uniform torque over a wider range of rotational angle. The wider slit will increases the initial torque and shortens a response time required to open the throttle valve from the fully-closed position against a larger air flow resistance. Further, the slit width and the stator configuration may be changed to change the range of uniform or flat torque characteristics.

(Eighth Embodiment)

Figure 16:
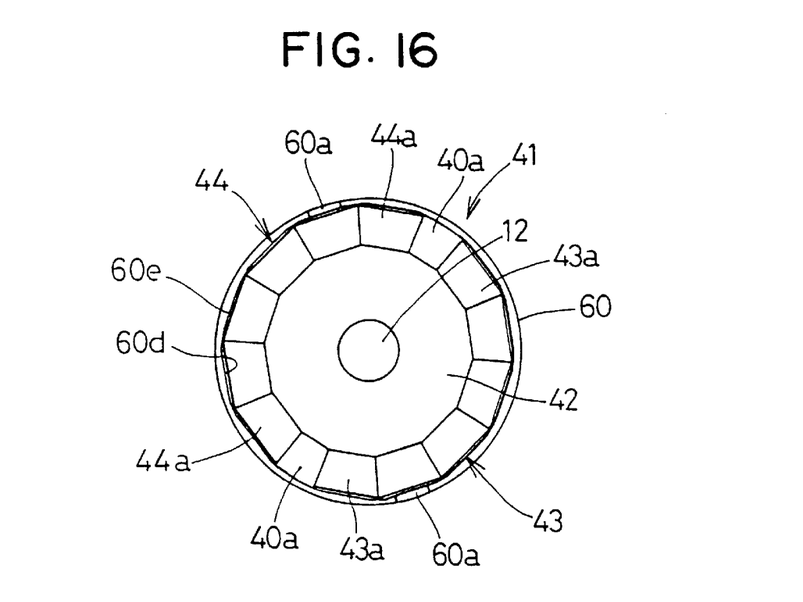
FIG. 16 is a side view showing a rotor according to an eighth embodiment of the present invention.

In the eighth embodiment shown in FIG. 16, each of the permanent magnets 43a and 44a is in a trapezoidal shape in section and extends axially in a rod shape so that the adjacent two permanent magnets contact tightly leaving no space therebetween in each magnet group. The cylindrical cover 60 is made by forging or by the similar machining process to have a polygonal inner peripheral surfaces which generally corresponds to the outer peripheral surfaces of the permanent magnets 43a and 44a. Thus, the space 60e between the inner peripheral surfaces 60d of the cylindrical cover 60 and the outer peripheral surfaces of the permanent magnets 43a and 44a is made more uniform in the circumferential. This uniform space 60e equalizes the magnetic flux density in the cylindrical cover 60 where the cylindrical cover 60 covers the permanent magnets 43a and 44a.

The present invention should not be limited to the foregoing embodiments but may be modified further. For instance, the torque motor may be a type in which a rotor is arranged radially outside of a stator to rotate around the stator or the torque motor may be applied to other devices as an actuator without departing from the spirit of the invention.

What is claimed is:

1. A motor comprising:
a rotor having a pair of magnet groups thereon for providing a pair of magnetic poles respectively around a rotary axis thereof, each of the magnet groups including a plurality of permanent magnets arranged in a circumferential direction;
a solenoid unit; and
a stator coupled with the solenoid unit for providing a pair of magnetic poles which face the magnetic poles of the rotor when the solenoid unit is energized, the magnetic poles of the stator having respective front ends that the magnet groups approach first during rotation of the rotor,
wherein one of (1) the front ends of the stator and (2) the magnet groups are arranged asymmetrically with respect to the rotary axis of the rotor, whereby the front ends of the stator are asymmetrical relative to the magnets of the rotor with respect to the axis of rotation, thereby to reduce periodic fluctuations in generated torque arising from said front ends during rotation of the rotor, wherein one of the magnet groups is displaced in the circumferential direction from a diametrical line crossing the rotary axis of the rotor and a circumferential center of the other of the magnet groups.

2. A motor as in claim 1, wherein each of the permanent magnets is in one of a plate and rod shape in section.

3. A motor as in claim 1, wherein one of the front ends of the stator is displaced in the circumferential direction from a diametrical line crossing the rotary axis of the rotor and the other of the front ends of the stator.

4. A motor as in claim 1, wherein the permanent magnets in each of the magnet groups are separated from each other in the circumferential direction.

5. A motor as in claim 4, wherein a non-magnetic material is filled in the spaces between said permanent magnets in each of the magnet groups and an outer periphery of the magnet groups is molded with a resin material mixed with fine magnetic particles.

6. A motor as in claim 1, wherein the rotor has a magnetic member covering the magnet groups.

7. A motor as in claim 6, wherein the magnetic member is in a cylindrical shape.

8. A motor as in claim 6, wherein the magnet groups are separated from each other in the circumferential direction leaving spaces therebetween, and the magnetic member has non-magnetic parts which cover the spaces, wherein said non-magnetic parts comprise slits in the magnetic member.

9. A motor as in claim 6, wherein the magnetic member and the permanent magnets have a substantially uniform gap therebetween in the circumferential direction.

10. A motor as in claim 1, wherein the asymmetric arrangement corresponds to half a pitch of one of said permanent magnet.

11. A motor as in claim 1, wherein a diametrical line crossing the rotary axis of the rotor and one of the front ends of the stator crosses the other of the front ends of the stator.

12. A motor comprising:
a rotor having a pair of magnet groups thereon for providing a pair of magnetic poles respectively around a rotary axis thereof, each of the magnet groups including a plurality of permanent magnets arranged in a circumferential direction;
a solenoid unit; and
a stator coupled with the solenoid unit for providing a pair of magnetic poles which face the magnetic poles of the rotor when the solenoid unit is energized, the magnetic poles of the stator having respective font ends that the magnet groups approach first during rotation of the rotor,
wherein one of the front ends of the stator and the magnet groups are arranged asymmetrically with respect to the rotary axis of the rotor, wherein the rotor and the stator are arranged so that the front end of one of the magnetic poles of the stator aligns with a circumferential center of one of the permanent magnets of one of the magnet groups when the front end of the other of the magnetic poles of the stator aligns with a circumferential end of one of the permanent magnets of the other of the magnet groups.

13. A motor comprising:
a stator;
a solenoid unit for magnetizing the stator when energized;
a rotor having a rotor core disposed rotatably relative to the stator and a plurality of permanent magnets arranged on a circumferential periphery of the rotor core; and
a magnetic member covering the permanent magnets,
wherein the permanent magnets are divided into a pair of magnet groups separated from each other in a circumferential direction leaving spaces therebetween, the permanent magnets are arranged in at least partial contact with a circumferentially adjacent one in each of the magnet groups, and the permanent magnets are magnetized in a same direction in each group and in an opposite direction from that in the other of the magnet groups, wherein the magnetic member has non-magnetic parts which cover the spaces, wherein the non-magnetic parts comprise slits in the magnetic member which face the spaces between the magnet groups.

14. A motor as in claim 13, wherein each of the permanent magnets is in a flat plate or rod shape extending in an axial direction.

15. A motor as in claim 13, wherein the magnetic member is in a cylindrical shape.

16. A motor as in claim 13, wherein the magnetic member and the permanent magnets have a substantially uniform gap circumferentially therebetween.

17. A motor as in claim 13, wherein each of the permanent magnets has a trapezoidal cross section and is arranged circumferentially to contact fully with a circumferentially adjacent permanent magnet.

18. A motor as in claim 13, wherein each said permanent magnet is magnetized in a radial direction.

19. A motor as in claim 13, wherein spaces between adjacent two of said permanent magnets in each magnet group are filled with a non-magnetic material and said magnetic member comprises a resin material mixed with fine magnetic particles molded to an outer periphery of said magnet groups.

20. A motor as in claim 13, wherein the magnet groups are arranged symmetrically with respect to the rotary axis of the rotor.

21. A motor as in claim 13, wherein the stator is coupled with a solenoid unit for providing a pair of magnetic poles which face the magnetic poles of the rotor when the solenoid unit is energized, the magnetic poles of the stator having respective front ends that the magnet groups first approach during rotation of the rotor and wherein the front ends of the stator are arranged asymmetrically with respect to the rotary axis of the rotor.

22. A motor comprising:
a stator;
a solenoid unit for magnetizing the stator when energized;
a rotor having a rotor core disposed rotatably relative to the stator and a plurality of permanent magnets arranged on a circumferential periphery of the rotor core; and
a magnetic member covering the permanent magnets, wherein the permanent magnets are divided into a pair of magnet groups separated from each other in a circumferential direction leaving spaces therebetween, and the magnetic member has non-magnetic parts which cover the spaces, wherein said non-magnetic parts comprise slits in the magnetic member which face the spaces between the magnet groups.

23. A motor comprising:
a stator;
a solenoid unit for magnetizing the stator when energized;
a rotor having a rotor core disposed rotatably relative to the stator and a plurality of permanent magnets arranged on a circumferential periphery of the rotor core, said permanent magnets being arranged in two groups having spaces therebetween; and
a magnetic member covering the permanent magnets, said magnetic member having slits defining non-magnetic parts of the magnetic member that are disposed solely above said spaces between said permanent magnet groups, wherein the magnetic member and the permanent magnets have a substantially uniform gap circumferentially therebetween.

24. A motor as in claim 23, wherein each said slit extends in an axial direction of the rotor core and the magnetic member includes cylindrical covering parts covering the magnet groups and connecting parts that connect the covering parts at axial ends of the slits.

25. A motor comprising:
a rotor having a pair of magnet groups thereon for providing a pair of magnetic poles respectively around a rotary axis thereof, each of the magnet groups including a plurality of permanent magnets arranged in a circumferential direction;
a solenoid unit; and
a stator coupled with the solenoid unit for providing a pair of magnetic poles which face the magnetic poles of the rotor when the solenoid unit is energized, the magnetic poles of the stator having respective front ends that the magnet groups approach first during rotation of the rotor, wherein one of (1) the front ends of the stator and (2) the magnet groups are arranged asymmetrically with respect to the rotary axis of the rotor, whereby the front ends of the stator are asymmetrical relative to the magnets of the rotor with respect to the axis of rotation, thereby to reduce periodic fluctuations in generated torque arising from said front ends during rotation of the rotor, wherein one of the front ends of the stator is displaced in the circumferential direction from a diametrical line crossing the rotary axis of the rotor and the other of the front ends of the stator, wherein a diametrical line crossing the rotary axis of the rotor and a circumferential center of one of the magnetic groups crosses a circumferential center of the other of the magnet groups.

26. A motor comprising:

a rotor having a pair of magnet groups thereon for providing a pair of magnetic poles respectively around a rotary axis thereof, each of the magnet groups including a plurality of permanent magnets arranged in a circumferential direction;

a solenoid unit; and a stator coupled with the solenoid unit for providing a pair of magnetic poles which face the magnetic poles of the rotor when the solenoid unit is energized, the magnetic poles of the stator having respective front ends that the magnet groups approach first during rotation of the rotor, wherein one of (1) the front ends of the stator and (2) the magnet groups are arranged asymmetrically with respect to the rotary axis of the rotor, whereby the front ends of the stator are asymmetrical relative to the magnets of the rotor with respect to the axis of rotation, thereby to reduce periodic fluctuations in generated torque arising from said front ends during rotation of the rotor, wherein the rotor has a magnetic member covering the magnet groups, and wherein the magnet groups are separated from each other in the circumferential direction leaving spaces therebetween, and the magnetic member has non-magnetic parts which cover the spaces, wherein said non-magnetic parts comprise slits in the magnetic member.

* * * * *